United States Patent
Truong et al.

(10) Patent No.: US 12,217,295 B2
(45) Date of Patent: Feb. 4, 2025

(54) METHOD, MEDIUM, AND SYSTEM FOR GENERATING SYNTHETIC DATA

(71) Applicant: Capital One Services, LLC, McLean, VA (US)

(72) Inventors: Anh Truong, Champaign, IL (US); Austin Walters, Savoy, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 603 days.

(21) Appl. No.: 16/935,013

(22) Filed: Jul. 21, 2020

(65) Prior Publication Data

US 2021/0019804 A1 Jan. 21, 2021

Related U.S. Application Data (63) Continuation of application No. 16/514,000, filed on Jul. 17, 2019, now Pat. No. 10,755,338.

(51) Int. Cl.
*G06Q 30/00* (2023.01)
*G06F 16/28* (2019.01)
(Continued)

(52) U.S. Cl.
CPC ....... *G06Q 30/0631* (2013.01); *G06F 16/285* (2019.01); *G06N 5/04* (2013.01); *G06N 20/00* (2019.01)

(58) Field of Classification Search
CPC .. G06Q 30/0631; G06F 16/285; G06N 20/00; G06N 5/04
See application file for complete search history.

(56) References Cited

U.S. PATENT DOCUMENTS 6,697,824 B1 * 2/2004 Bowman-Amuah ........................ G06F 16/958
707/E17.116
9,607,272 B1 * 3/2017 Yu ........................... G06N 20/00
(Continued)

FOREIGN PATENT DOCUMENTS

WO WO 2018/194707 A1 10/2018

OTHER PUBLICATIONS

Dec. 2018 - https://machinelearningmastery.com/train-neural-networks-with-noise-to-reduce-overfitting/ (Year: 2018).*
(Continued)

*Primary Examiner* — Matthew E Zimmerman
(74) *Attorney, Agent, or Firm* — Finnegan, Henderson, Farabow, Garrett & Dunner, LLP (57) ABSTRACT

Systems and methods for generating synthetic data are disclosed. A system may include one or more memory devices storing instructions and one or more processors configured to execute the instructions. The instructions may instruct the system to categorize consumer data based on a set of characteristics. The instructions may also instruct the system to receive a first request to generate a first synthetic dataset. The first request may specify a first requirement for at least one of the characteristics. The instructions may further instruct the system to retrieve, from the consumer data, a first subset of the consumer data satisfying the first requirement. The instructions may also instruct the system to provide the first subset of consumer data as input to a data model to generate the first synthetic dataset, and to provide the first synthetic dataset as training data to a machine-learning system.

20 Claims, 3 Drawing Sheets

(51) Int. Cl.
    *G06N 5/04*        (2023.01)
    *G06N 20/00*      (2019.01)
    *G06Q 30/0601*   (2023.01)

(56) References Cited

U.S. PATENT DOCUMENTS

2017/0236182 A1*   8/2017   Ignatyev ............ G06Q 30/0631
                                                                              705/26.7
2018/0144268 A1*   5/2018   Wilson .................... G06N 5/022
2018/0144269 A1*   5/2018   Wilson .................... G06N 5/022

OTHER PUBLICATIONS

Le, Tuan Anh, et al. "Using synthetic data to train neural networks is model-based reasoning." 2017 International Joint Conference on Neural Networks (IJCNN). IEEE (Year: 2017).*
https://machinelearningmastery.com/train-neural-networks-with-noise-to-reduce-overfitting/ (Year: 2018).*
T. A. Le et al., *Using synthetic data to train neural networks is model-based reasoning*, 2017 International Joint Conference on Neural Networks (IJCNN). IEEE. (Year: 2017).
A. Narayanan, *Synthetic Data Generator For User Behavioral Analytics Systems*—Master of Computer Science with Data Science Specialization, Sep. 2017, 89 pgs.

\* cited by examiner

METHOD, MEDIUM, AND SYSTEM FOR GENERATING SYNTHETIC DATA

This application is a continuation of and claims the benefit of priority to U.S. patent application Ser. No. 16/514,000, filed Jul. 17, 2019, the contents of which is hereby incorporated herein by reference in its entirety.

TECHNICAL FIELD

The present disclosure generally relates to artificial intelligence systems, and more particularly, to systems and methods for generating synthetic data for testing or training artificial intelligence systems.

BACKGROUND

Artificial intelligence systems utilized to determine consumer behaviors or purchase recommendations typically require efficient data and model pipelines so that recommendations can be provided quickly and the corresponding models can be retrained quickly. Training artificial intelligence systems can require substantial amounts of training data. Preparing training data for such artificial intelligence systems is time consuming, especially for artificial intelligence systems designed to operate on sensitive data, such as customer financial records or patient healthcare data. Potential sensitive data must be anonymized. Furthermore, regulations governing the storage, transmission, and distribution of such data can inhibit application development, by forcing the development environment to comply with these burdensome regulations.

Synthetic data can be generally useful for testing and training artificial intelligence systems. However, existing methods of creating synthetic data are slow and error-prone. For example, attempts to automatically desensitize data using regular expressions or similar methods requires substantial expertise and can fail when sensitive data is present in unanticipated formats or locations. Manual attempts to desensitize data can fall victim to human error. Neither approach will create synthetic data having statistical characteristics similar to those of the original data, limiting the utility of such data for training and testing purposes.

Accordingly, a need exists for improved systems and methods of creating synthetic data for testing or training artificial intelligence systems.

BRIEF SUMMARY

The disclosed embodiments include systems and methods for generating synthetic data.

In one embodiment, a system is disclosed. The system may include one or more memory devices storing instructions and one or more processors configured to execute the instructions. The instructions may instruct the system to categorize consumer data based on a set of characteristics. The instructions may also instruct the system to receive a first request to generate a first synthetic dataset. The first request may specify a first requirement for at least one of the characteristics. The instructions may further instruct the system to retrieve, from the consumer data, a first subset of the consumer data satisfying the first requirement. The instructions may also instruct the system to provide the first subset of consumer data as input to a data model to generate the first synthetic dataset, and to provide the first synthetic dataset as training data to a machine-learning system.

In another embodiment, a method is disclosed. The method may include categorizing historical data based on a set of characteristics. The method may also include receiving a first request to generate a first synthetic dataset. The first request may specify a first requirement for at least one of the characteristics. The method may further include retrieving, from the historical data, a first subset of historical data satisfying the first requirement. The method may also include providing the first subset of historical data as input to a data model to generate the first synthetic dataset, and providing the first synthetic dataset as training data to a machine-learning system.

In another embodiment, a non-transitory memory is disclosed. The non-transitory memory may store instructions that, when executed by at least one processor, cause a system to perform operations. The operations may include categorizing consumer data based on a set of characteristics. The operations may also include receiving a first request to generate a first synthetic dataset. The first request may specify a first requirement for at least one of the characteristics. The operations may further include retrieving, from the consumer data, a first subset of consumer data satisfying the first requirement. The operations may also include providing the first subset of consumer data as input to a data model to generate the first synthetic dataset, and providing the first synthetic dataset as training data to a machine-learning system to determine at least one of a consumer behavior or a purchase recommendation.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings.

DETAILED DESCRIPTION

Reference will now be made to exemplary embodiments, examples of which are illustrated in the accompanying drawings and disclosed herein. Wherever convenient, the same reference numbers will be used throughout the drawings to refer to the same or like parts.

Figure 1:
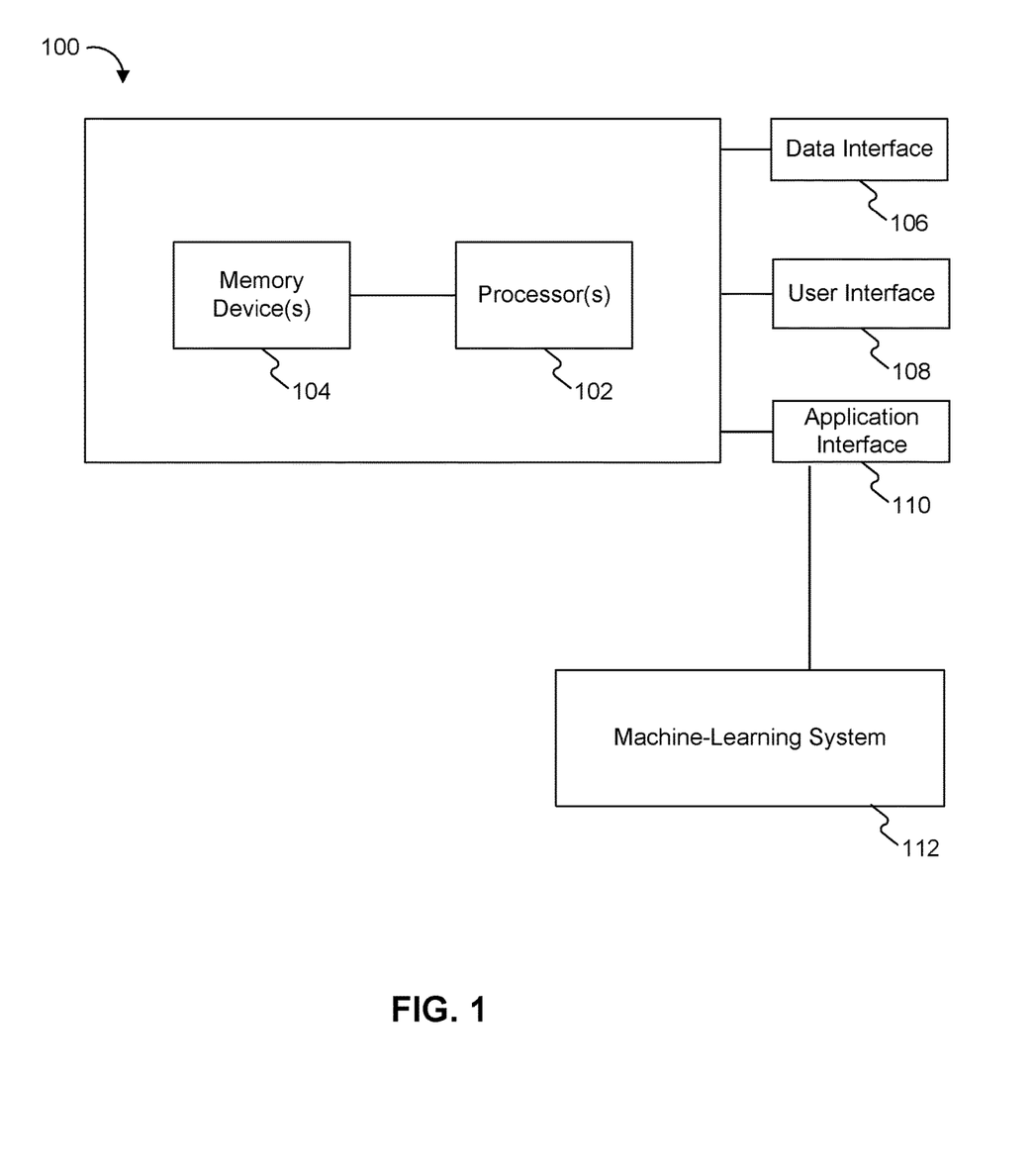
FIG. 1 is a block diagram illustrating an exemplary synthetic data generation system, consistent with disclosed embodiments.

FIG. 1 is a block diagram illustrating an exemplary synthetic data generation system 100, consistent with disclosed embodiments. System 100 may include one or more dedicated processing units 102, such as application-specific integrated circuits (ASICs), field-programmable gate arrays (FPGAs), or various other types of processors or processing units, coupled with one or more non-transitory processor-readable memories 104 configured for storing processor-executable code. The system 100 may also include one or more interfaces, such as a data interface 106, a user interface 108, and an application interface 110, to interact with databases, users, and other computing systems. When instructions are executed by processor 102, processor 102 may perform operations including categorizing historical data, retrieving from the historical data a subset of data that satisfies a requirement established for generating a synthetic dataset, and providing the retrieved subset of data as input to a data model to generate the synthetic dataset. In some embodiments, the synthetic dataset may include synthetic consumer behavior data or synthetic consumer interaction data, which can be provided to test or train artificial intelligence systems (e.g., an artificial intelligence system implemented on a machine-learning system 112) configured to determine consumer behaviors or purchase recommendations.

In some embodiments, processor 102 may perform operations to categorize historical data based on a set of characteristics. For example, suppose that processor 102 is provided with access to records containing a retail store's consumer data and purchase history (collectively referred to as historical consumer data for illustrative purposes), processor 102 may perform operations to categorize the historical consumer data based on certain characteristics. The characteristics may include, for example, sparsity, transaction volume, click-through rate and the like. "Sparsity" may occur when only limited historical data associated with a consumer is available (e.g., if the consumer has conducted a limited number of transactions or provided a limited number of product reviews). Processor 102 may identify a list of consumers with sparse consumer data, which may include, for example, a list of consumers who have conducted less than a threshold number of transactions or provided less than a threshold number of product reviews. Processor 102 may also identify a list of consumers with non-sparse consumer data, which may include, for example, a list of consumers who have conducted more than a threshold number of transactions or provided more than a threshold number of product reviews. Similarly, processor 102 may identify a list of consumers with low transaction volumes, a list of consumers with medium transaction volumes, and a list of consumers with high transaction volumes. Processor 102 may further identify a list of consumers with low click-through rates, a list of consumers with medium click-through rates, and a list of consumers with high click-through rates.

It is to be understood that characteristics such as sparsity, transaction volume, and click-through rate described above are merely examples and are not meant to be limiting. Processor 102 may perform operations to categorize the historical consumer data based on other characteristics without departing from the spirit and scope of the present disclosure. It is also to be understood that categorizing consumers into sparse or non-sparse, or categorizing consumers into categories such as low transaction volume, medium transaction volume, or transaction volume as described above are merely examples and are not meant to be limiting. It is contemplated that processor 102 may categorize consumers into various number of categories for each one of the set of characteristics based on the consumer data provided.

In some embodiments, processor 102 may save the result after categorizing the consumer data so that processor 102 can quickly search through the consumer data and identify records that satisfy a certain requirement. Processor 102 may, for example, save the result as a data catalog on a memory device 104. The data catalog may include a list of categories (e.g., low, medium, and high) identified for each characteristic, and each identified category may include one or more indices with references to consumer data representing consumers who have been identified as belonging to that category. In this manner, if processor 102 needs to retrieve a list of consumers with low click-through rates, the processor 102 may reference the data catalog to locate indices with references to consumer data representing consumers who have been identified as having low click-through rates.

The ability to retrieve consumer data in this manner allows processor 102 to selectively provide consumer data as input to a data model configured to generate synthetic data. For example, in some embodiments, processor 102 may select a subset of consumer data that satisfies certain requirements and only provide the subset of consumer data to the data model for synthetic data generation. Specifically, processor 102 may receive a request to generate a synthetic dataset. The request may specify a requirement for at least one of the characteristics for the synthetic dataset. Continuing with the example above, the requirement may specify that, for the synthetic dataset, the sparsity should be non-sparse, the transaction volume should be high, and the click-through rate should be high.

In some embodiments, the request may be specified by a user. For example, a data scientist training a machine-learning system 112 configured to determine consumer behaviors or purchase recommendations may specify the request through user interface 108. Alternatively, or additionally, the request may be specified by machine-learning system 112 through application interface 110. Upon receiving the request to generate a synthetic dataset, processor 102 may perform operations to retrieve, from the consumer data, a subset of the consumer data that satisfies the requirement specified in the request. If the request specifies that, for the synthetic dataset, the sparsity should be non-sparse, the transaction volume should be high, and the click-through rate should be high, processor 102 may in turn perform operations to retrieve a subset of consumers who have high transaction volume and click-through rate and are considered to be non-sparse. Processor 102 may then provide the subset of consumer data as input to a data model to generate the synthetic dataset as requested. Processor 102 may further provide the synthetic dataset generated by the data model to machine-learning system 112, which may utilize the synthetic dataset to train or to determine consumer behaviors and purchase recommendations.

It is contemplated that processor 102 may be configured to process consumer data stored in various types of formats. For example, in some embodiments, the consumer data may include unstructured data such as character strings, tokens, log data and the like. Alternatively, or additionally, the consumer data may include structured data such as key-value pairs, relational database files, spreadsheets, tabular data and the like. In some embodiments, processor 102 may be configured to retrieve the subset of consumer data without modifying the original format of the consumer data. In other words, if the consumer data is stored as unstructured data, processor 102 may retrieve a subset of consumer data, which is unstructured, and provide that subset of unstructured data as input to a data model to generate the synthetic dataset. On the other hand, if the consumer data is stored as structured data, processor 102 may retrieve a subset of consumer data, which is structured, and provide that subset of structured consumer data as input to a data model to generate the synthetic dataset.

In some embodiments, processor 102 may choose which data model should receive the subset of consumer data based on whether the subset of consumer data is unstructured or structured. If the subset of consumer data is unstructured, processor 102 may choose a data model capable of processing unstructured data input. For example, data models described in U.S. application Ser. No. 16/151,385, filed Oct. 4, 2018, U.S. application Ser. No. 16/151,407, filed Oct. 4, 2018, and U.S. application Ser. No. 16/163,518, filed Oct. 17, 2018, which are incorporated herein by reference, may be used to generate the synthetic dataset based on unstructured data input. On the other hand, if the subset of consumer data is structured, processor 102 may choose a data model capable of processing structured data input.

For example, as described in U.S. application Ser. No. 16/163,518, the data model may receive as input the subset of consumer data, which may be unstructured (e.g., including data such as character strings, tokens, log data and the like). In some embodiments, a recurrent neural network (RNN) may be utilized to determine the sequence of information presented in the unstructured data and reflect that sequence in generating the synthetic dataset. For example, the RNN may automatically identify the sequential order or information in the unstructured data. If the unstructured data is system log, for instance, the RNN may recognize the order such as user name, user identification, date and/or time, operation, etc. In another example, if the unstructured data is an email log, the RNN may recognize the order such as user name, recipient, sender, date and/or time, subject, etc.

In some examples, the unstructured data input may include log files of a particular category or type. A log type or category may be, for example, an email log, an operating system log, a Microsoft Office® log, a Java® log, or the like. Additionally or alternatively, a log may have been generated by a particular application, e.g., Google Chrome®, Microsoft Word®, Windows® 10 Update, or the like. Documents of the same type or category and/or generated by the same application may include the same or similar patterns and/or distributions (such as distributions of characters, integers, letters, alphanumeric characters, special characters, or the like). The data model may feed the subset of consumer data as input to the RNN to generate a synthetic dataset.

In other examples, data models described in U.S. application Ser. No. 16/151,385 and U.S. application Ser. No. 16/151,407 may be utilized to generate synthetic dataset based on structured data input (e.g., including data such as key-value pairs, relational database files, spreadsheets, tabular data and the like). The data model may generate a synthetic dataset using a generative network, which may be trained to generate the synthetic dataset that differs at least a predetermined amount from the structured data input provided as input to the data model. Furthermore, in some embodiments, the data model may train the generative network so that the generative network can generate output data with less than a predetermined proportion of duplicate elements.

Figure 2:
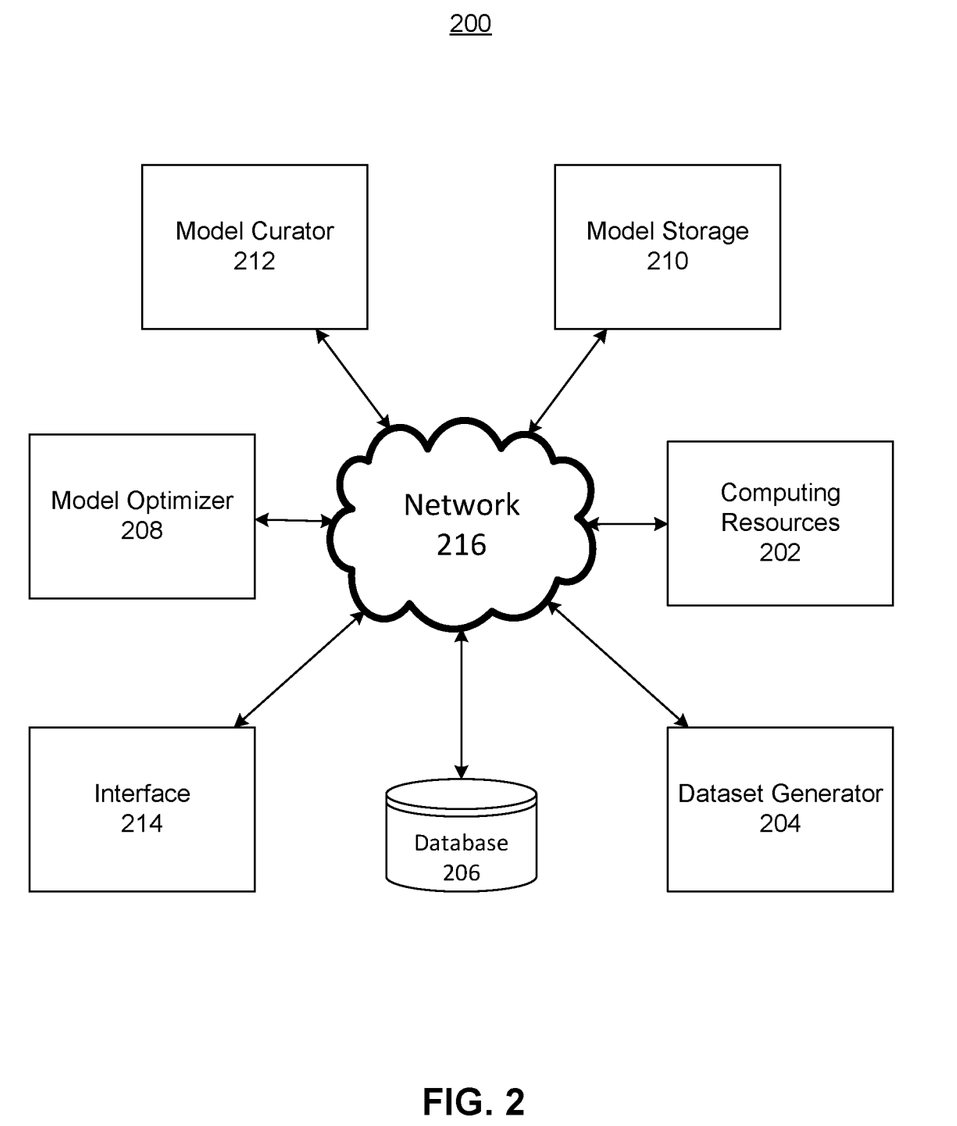
FIG. 2 is an exemplary cloud-computing environment for generating data models, consistent with disclosed embodiments.

In some embodiments, processor 102 may provide the subset of consumer data as input to a cloud-computing system to generate the synthetic dataset as requested. FIG. 2 depicts an exemplary cloud-computing system 200. System 200 can be configured to support generation and storage of synthetic data, generation and storage of data models, optimized choice of parameters for machine learning, and imposition of rules on synthetic data and data models. System 200 can be configured to expose an interface for communication with other systems, including system 100 (FIG. 1). System 200 can include computing resources 202, a dataset generator 204, a database 206, a model optimizer 208, a model storage 210, a model curator 212, and an interface 214. These components of system 200 can be configured to communicate with each other, or with external components of system 200, using a network 216. The particular arrangement of components depicted in FIG. 2 is not intended to be limiting. System 200 can include additional components, or fewer components. Multiple components of system 200 can be implemented using the same physical computing device or different physical computing devices.

Computing resources 202 can include one or more computing devices configurable to train data models. The computing devices can be special-purpose computing devices, such as graphical processing units (GPUs) or application-specific integrated circuits, or general-purpose computing devices. The computing devices can be configured to host an environment for training data models. For example, the computing devices can host virtual machines, pods, or containers. The computing devices can be configured to run applications for generating data models. For example, the computing devices can be configured to run Amazon Web Services (AWS) SageMaker, Tensorflow, or similar machine-learning training applications. Computing resources 202 can be configured to receive models for training from model optimizer 208, model storage 210, or another component of system 200. Computing resources 202 can be configured to provide training results, including trained models and model information, such as the type and/or purpose of the model and any measures of classification error.

Dataset generator 204 can include one or more computing devices configured to generate data. Dataset generator 204 can be configured to provide data to computing resources 202, database 206, another component of system 200 (e.g., interface 214), or another system (e.g., an APACHE KAFKA cluster or other publication service). Dataset generator 204 can be configured to receive input provided by processor 102 (FIG. 1) through interface 214. The input provided by processor 102 may include the subset of consumer data as described above. Dataset generator 204 can also receive data models from model storage 210 or another component of system 200 and use the data models to generate synthetic data. For example, dataset generator 204 can be configured to generate synthetic data by identifying and replacing sensitive information in the subset of consumer data. As an additional example, dataset generator 204 can be configured to use the subset of consumer data as training data and use a data model to generate additional synthetic data. The data model can be configured to generate synthetic data matching statistical and content characteristics of the training data. In some aspects, the data model can be configured to map from a random or pseudorandom vector to elements in the training data space. One or more techniques disclosed in U.S. application Ser. No. 16/151,385, filed Oct. 4, 2018, U.S. application Ser. No. 16/151,407, filed Oct. 4, 2018, and U.S. application Ser. No. 16/163,518, filed Oct. 17, 2018 may be used to generate the synthetic data disclosed herein.

Database 206 can include one or more databases configured to store data for use by system 200. For example, database 206 may store training data for synthetic data generation and/or for neural network training. The databases can include cloud-based databases (e.g., AMAZON WEB SERVICES S3 buckets) or on-premises databases.

Model optimizer 208 can include one or more computing systems configured to manage training of data models for system 200. Model optimizer 208 can be configured to generate models for export to computing resources 202, or models based on instructions received from a user or another system. These instructions can be received through interface 214. For example, model optimizer 208 can be configured to receive a graphical depiction of a machine-learning model and parse that graphical depiction into instructions for creating and training a corresponding neural network on computing resources 202. Additionally, or alternatively, model optimizer 208 can be configured to generate a neural network template by retrieving a neural network from model storage 210 and resetting at least one weight and at least one activation function of the neural network while retaining the structure. In some embodiments, model optimizer 208 can be configured to select model training parameters. This selection can be based on model performance feedback received from computing resources 202. Model optimizer 208 can be configured to provide trained models and descriptive information concerning the trained models to model storage 210.

Model storage 210 can include one or more databases configured to store data models and descriptive information for the data models. Model storage 210 can be configured to provide information regarding available data models to a user or another system using, for example, interface 214. The databases can include cloud-based databases (e.g., AMAZON WEB SERVICES S3 buckets) or on-premises databases. The information can include model information, such as the type and/or purpose of the model and any measures of classification error.

Model curator 212 can be configured to impose governance criteria on the use of data models. For example, model curator 212 can be configured to delete or control access to models that fail to meet accuracy criteria. As a further example, model curator 212 can be configured to limit the use of a model to a particular purpose, or by a particular entity or individual. In some aspects, model curator 212 can be configured to ensure that a data model satisfies governance criteria before system 200 can process data using the data model. Additionally, or alternatively, model curator 212 can be configured to index neural networks by indicators of patterns, character distributions, or other properties of unstructured data accepted as input to the neural networks.

Interface 214 can be configured to manage interactions between system 200 and other systems using network 216. In some aspects, interface 214 can be configured to publish data received from other components of system 200 (e.g., dataset generator 204, computing resources 202, database 206, or the like). This data can be published in a publication and subscription framework (e.g., using APACHE KAFKA), through a network socket, in response to queries from other systems, or using other known methods. The data can be synthetic data, as described herein. As an additional example, interface 214 can be configured to provide information received from model storage 210 regarding available datasets. In various aspects, interface 214 can be configured to provide data or instructions received from other systems to components of system 200. For example, interface 214 can be configured to receive instructions for generating data models (e.g., type of data model, data model parameters, training data indicators, training parameters, or the like) from another system and provide this information to model optimizer 208. As an additional example, interface 214 can be configured to receive data including sensitive portions from another system (e.g. in a file, a message in a publication and subscription framework, a network socket, or the like) and provide that data to dataset generator 204 or database 206.

Network 216 can include any combination of electronics communications networks enabling communication between components of system 200. For example, network 216 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

It is to be understood that system 200 is depicted merely as an example for implementing a cloud-computing system capable of generating synthetic dataset based on input provided by processor 102. It is contemplated that processor 102 may be configured to provide the subset of consumer data as input to other systems to generate the synthetic dataset as requested without departing from the spirit and scope of the present disclosure. Once the synthetic dataset is generated, processor 102 may provide the synthetic dataset to machine-learning system 112, which may utilize the synthetic dataset to train or to determine consumer behaviors and purchase recommendations.

It is contemplated that there may be situations where the synthetic dataset is determined to be insufficient for training machine-learning system 112 (FIG. 1). This may occur, for example, if the requirement specified in the request for synthetic dataset was too narrow or too broad, leading to the generation of a synthetic dataset that is not as intended by the user (e.g., a data scientist). In such cases, the user may deem the synthetic dataset insufficient and may send a second request to synthetic data generation system 100 to request generation of a second synthetic dataset.

The second request may specify a second requirement. The second requirement may be different from the previously specified requirement. For example, instead of requiring the sparsity to be non-sparse, the transaction volume to be high, and the click-through rate to be high, the second request may specify that, for the second synthetic dataset, the sparsity should be sparse (e.g., representing consumers who tend to provide limited number of feedbacks or product ratings), the transaction volume should be high, and the click-through rate should be high. Processor 102 may in turn perform operations to retrieve a second subset of consumers who have high transaction volume and click-through rate and are considered to be sparse. Processor 102 may provide the second subset of consumer data as input to a data model to generate a second synthetic dataset as requested. Processor 102 may further provide the second synthetic dataset generated by the data model to machine-learning system 112, which may utilize the second synthetic dataset to train or to determine consumer behaviors and purchase recommendations. Alternatively, processor 102 may combine the previously-provided (first) synthetic dataset and the second synthetic dataset together and provide the combined synthetic dataset to machine-learning system 112.

In some embodiments, synthetic data generation system 100 may also allow machine-learning system 112 to issue requests to generate synthetic datasets. Machine-learning system 112 may issue such a request when machine-learning system 112 determines that the synthetic dataset currently being used is insufficient for training machine-learning system 112. Machine-learning system 112 may make such a determination when the data model being trained cannot converge or fails to satisfy a benchmark. Machine-learning system 112 may also consider other factors such as the size of the synthetic dataset and the like to decide whether to issue a request to generate a second (or an additional) synthetic dataset.

As will be appreciated from the above, synthetic data generation system 100 configured in accordance with the present disclosure may allow users (e.g., data scientists) or machine-learning systems (e.g., machine-learning system 112) to specify requirement for synthetic datasets needed for training. Synthetic data generation system 100 also allows users and machine-learning systems to adjust the requirement as needed. In some embodiments, adjustments may be needed in response to changes in consumer behavior observed based on real data. Adjustments provided in this manner may function as a feedback loop between machine-learning system 112 and synthetic data generation system 100, allowing synthetic data generation system 100 to provide synthetic datasets that are more relevant for training machine-learning system 112, which in term may be better trained using the synthetic datasets provided by synthetic data generation system 100.

Figure 3:
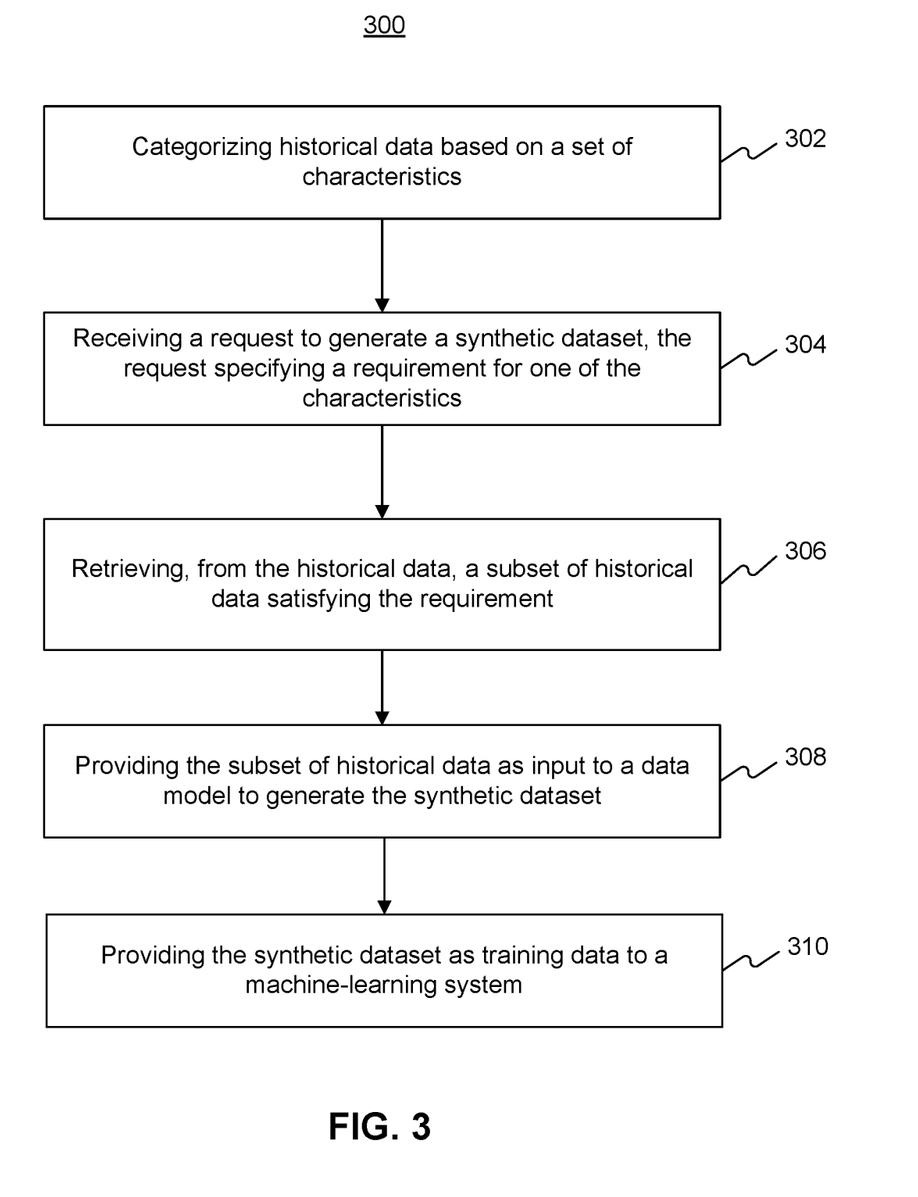
FIG. 3 is a flow diagram of an exemplary method for generating synthetic data, consistent with disclosed embodiments.

Referring now to FIG. 3, there is shown a flow diagram illustrating an exemplary method 300 for generating synthetic data. While method 300 is described herein as a sequence of steps, it is to be understood that the order of the steps may vary in other implementations. In particular, steps may be performed in any order, or in parallel. It is to be understood that steps of method 300 may be performed by one or more processors, computers, servers, controllers or the like.

In some embodiments, method 300 may be performed by synthetic data generation system 100 (as depicted in FIG. 1). At step 302, method 300 may include categorizing historical consumer data based on a set of characteristics. For example, suppose that method 300 is provided with access to records containing a retail store's consumer data and purchase history. Method 300, at step 302, may then categorize the consumer data based on certain characteristics such as sparsity, transaction volume, click-through rate and the like. Method 300 may save the result after categorizing the consumer data so that method 300 can quickly search through the consumer data and identify records that satisfy a certain requirement.

At step 304, method 300 may receive a first request to generate a first synthetic dataset. The first request may specify a first requirement for at least one of the characteristics. For example, the first request may specify that, for the first synthetic dataset, the sparsity should be low, the transaction volume should be high, and the click-through rate should be high.

At step 306, method 300 may retrieve, from the consumer data, a first subset of the consumer data satisfying the first requirement. At step 308, method 300 may provide the first subset of consumer data as input to a data model to generate the first synthetic dataset. In some embodiments, method 300 may provide the first subset of consumer data to one or more data models described in U.S. application Ser. No. 16/151,385, filed Oct. 4, 2018, U.S. application Ser. No. 16/151,407, filed Oct. 4, 2018, and U.S. application Ser. No. 16/163,518, filed Oct. 17, 2018, which may generate the first synthetic dataset as requested. At step 310, method 300 may provide the first synthetic dataset as training data to a machine-learning system (e.g., machine-learning system 112 as depicted in FIG. 1).

In some embodiments, steps 304-310 described above may be repeated to generate a second synthetic dataset. Specifically, method 300 may receive a second request to generate a second synthetic dataset. The second request may specify a second requirement for at least one of the characteristics. Method 300 may retrieve, from the consumer data, a second subset of consumer data satisfying the second requirement. Method 300 may provide the second subset of consumer data as input to the data model to generate the second synthetic dataset. Method 300 may provide the second synthetic dataset as training data to the machine-learning system. In some embodiments, steps 304-310 may be repeated multiple times to generate additional synthetic datasets.

In some examples, some or all of the logic for the above-described techniques may be implemented as a computer program or application or as a plug-in module or subcomponent of another application. The described techniques may be varied and are not limited to the examples or descriptions provided.

Moreover, while illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified. Further, with respect to the exemplary methods illustrated in the attached drawings, the order and sequence of steps may be modified, and steps may be added or deleted.

Thus, the foregoing description has been presented for purposes of illustration only. It is not exhaustive and is not limiting to the precise forms or embodiments disclosed. Modifications and adaptations will be apparent to those skilled in the art from consideration of the specification and practice of the disclosed embodiments.

The claims are to be interpreted broadly based on the language employed in the claims and not limited to examples described in the present specification, which examples are to be construed as non-exclusive. Further, the steps of the disclosed methods may be modified in any manner, including by reordering steps and/or inserting or deleting steps.

Furthermore, although aspects of the disclosed embodiments are described as being associated with data stored in memory and other tangible computer-readable storage mediums, one skilled in the art will appreciate that these aspects may also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

What is claimed is:

1. A system, comprising:
one or more memory devices storing instructions; and
one or more processors configured to execute the instructions to perform operations comprising:
categorizing historical consumer data based on a set of characteristics comprising at least one of a transactional volume, a click-through rate, or whether the historical consumer data falls below a sparsity limit;
receiving a first request to generate a first synthetic dataset as training data to a machine learning system, the first request specifying a first requirement for at least one of the characteristics;
retrieving, from the historical consumer data, a first subset of the historical consumer data satisfying the first requirement;
providing the first subset of the historical consumer data as input to a data model, the data model mapping from a random or pseudorandom vector to elements in a training data space, to generate the first synthetic dataset for the machine learning system, wherein generating the first synthetic dataset comprises determining a vector connecting a first representative point and a second representative point in code space; and providing the first synthetic dataset as training data to the machine learning system.

2. The system of claim 1, wherein generating the first synthetic dataset for the data model further includes generating a first representative point and a second representative point in a sample space or a code space.

3. The system of claim 1, wherein providing the first synthetic dataset comprises providing the first synthetic dataset to the machine learning system which utilizes synthetic datasets to determine a purchase recommendation.

4. The system of claim 1, wherein the first requirement comprises a user-specified requirement.

5. The system of claim 1, wherein the first requirement comprises a requirement specified by the machine learning system.

6. The system of claim 1, wherein the historical consumer data comprises unstructured data.

7. The system of claim 1, wherein the historical consumer data comprises structured data.

8. The system of claim 1, wherein the operations further comprise:
receiving a second request to generate a second synthetic dataset, the second request specifying a second requirement for at least one of the characteristics;
retrieving, from the historical consumer data, a second subset of the historical consumer data satisfying the second requirement, the historical consumer data comprising at least one of non-sparse consumer data including consumer data of consumers associated with a threshold number of transactions or product reviews falling below a certain limit or sparse consumer data including consumer data of consumers associated with a threshold number of transactions or product reviews falling below a limit;
providing the second subset of the historical consumer data as input to the data model to generate the second synthetic dataset; and
providing the second synthetic dataset as training data to the machine learning system.

9. The system of claim 8, wherein the second requirement comprises a user-specified requirement.

10. The system of claim 8, wherein the second requirement comprises a requirement specified by the machine learning system.

11. The system of claim 10, wherein the second requirement comprises a requirement specified by the machine learning system, based on a determination that the first synthetic dataset is insufficient for training the machine learning system.

12. A method, comprising:
categorizing historical consumer data based on a set of characteristics comprising at least one of transactional volume, a click-through rate, or whether the historical consumer data falls below a sparsity limit;
receiving a first request to generate a first synthetic dataset, the first request specifying a first requirement for at least one of the characteristics, the first requirement identifying at least one of a plurality of categories;
receiving a first request to generate a first synthetic dataset as training data to a machine learning system, the first request specifying a first requirement for at least one of the characteristics, the first requirement identifying at least one of the plurality of categories;

providing a first subset of the historical consumer data as input to a data model to generate the first synthetic dataset, the data model mapping from a random or pseudorandom vector to elements in a training data space, wherein generating the first synthetic dataset comprises determining a vector connecting a first representative point and a second representative point in code space; and
providing the first synthetic dataset as training data to a machine learning system.

13. The method of claim 12, further comprising: receiving the first requirement from a user.

14. The method of claim 12, further comprising:
receiving the first requirement from the machine learning system.

15. The method of claim 12, wherein the historical consumer data comprises unstructured data.

16. The method of claim 12, wherein the historical consumer data comprises structured data.

17. The method of claim 12, further comprising:
receiving a second request to generate a second synthetic dataset, the second request specifying a second requirement for at least one of the characteristics;
retrieving, from the historical consumer data, a second subset of the historical consumer data satisfying the second requirement, the historical consumer data comprising at least one of non-sparse consumer data including consumer data of consumers associated with a threshold number of transactions or product reviews falling below a certain limit or sparse consumer data including consumer data of consumers associated with a threshold number of transactions or product reviews falling below a limit;
providing the second subset of the historical consumer data as input to the data model to generate the second synthetic dataset; and
providing the second synthetic dataset as training data to the machine learning system.

18. The method of claim 17, further comprising:
receiving the second requirement from the machine learning system.

19. The method of claim 18, further comprising:
specifying the second requirement by the machine learning system, based on a determination that the first synthetic dataset is insufficient for training the machine learning system.

20. A non-transitory memory storing instructions that, when executed by at least one processor, cause a system to perform operations comprising:
categorizing historical consumer data based on a set of characteristics comprising at least one of transactional volume, click-through rate, or whether the historical consumer data falls below a sparsity limit;
receiving a first request to generate a first synthetic dataset, the first request specifying a first requirement for at least one of the characteristics, the first requirement identifying at least one of a plurality of categories;
retrieving, from the historical consumer data, a first subset of the historical consumer data satisfying the first requirement;
providing the first subset of the historical consumer data as input to a data model to generate the first synthetic dataset, the data model mapping from a random or pseudorandom vector to elements in a training data space, wherein generating the first synthetic dataset comprises determining a vector connecting a first representative point and a second representative point in code space; and providing the first synthetic dataset as training data to a machine learning system to determine at least one of a consumer behavior or a purchase recommendation.

* * * * *